United States Patent [19]

Herrick et al.

[11] Patent Number: 4,836,451
[45] Date of Patent: Jun. 6, 1989

[54] YAW AND PITCH CONVERGENT-DIVERGENT THRUST VECTORING NOZZLE

[75] Inventors: Paul W. Herrick; Edward B. Thayer; Jim D. Stewart, all of Jupiter, Fla.

[73] Assignee: United Technologies Corporation, Hartford, Conn.

[21] Appl. No.: 95,294

[22] Filed: Sep. 10, 1987

[51] Int. Cl.[4] .......................... F02K 1/32; F02K 1/60; F02K 1/12
[52] U.S. Cl. .................................. 239/265.27; 239/35; 239/37; 60/229; 60/232
[58] Field of Search .................... 239/265.19, 265.35, 239/265.33, 265.37, 265.39, 265.27; 60/228, 230, 232, 271, 229; 244/52, 110 B, 23 D, 12.5

[56] References Cited

U.S. PATENT DOCUMENTS

| | | | |
|---|---|---|---|
| 3,003,312 | 10/1961 | Jewell | 239/265.35 |
| 3,032,982 | 5/1962 | Gaubatz | 239/265.35 |
| 3,048,977 | 8/1962 | Geary, Jr. | 60/35.55 |
| 3,438,581 | 4/1969 | Smith | 239/265.35 |
| 3,908,908 | 9/1975 | Johnson | 239/265.35 |
| 4,274,593 | 6/1981 | Joubert | 239/265.35 |
| 4,318,271 | 3/1982 | Doukakis et al. | 60/232 |
| 4,363,445 | 12/1982 | Bouiller et al. | 239/265.35 |
| 4,449,678 | 5/1984 | Hapke | 239/265.19 |

FOREIGN PATENT DOCUMENTS 1025827  4/1953  France ........................... 239/265.35

*Primary Examiner*—Andres Kashnikow
*Assistant Examiner*—Chris Trainor
*Attorney, Agent, or Firm*—Troxell K. Snyder

[57] ABSTRACT

A yaw and pitch thrust vectoring exhaust nozzle includes a spherical collar, and two surrounding clam shells hinged to a gimbal ring and pivotal about an axis perpendicular to the clam shell hinge axis. The clam shells define a variable area nozzle throat (42) which can be selectively directed vertically by rotation of the clam shells about the hinge axis (38), or horizontally by rotation of the clam shells and gimbal ring about the pivot axis (30), thereby biasing the nozzle exhaust flow vector. Divergent flaps (44, 46) further direct the exhaust downstream of the nozzle throat (42).

7 Claims, 5 Drawing Sheets

YAW AND PITCH CONVERGENT-DIVERGENT THRUST VECTORING NOZZLE'

DESCRIPTION

Field of the Invention

The present invention relates to an exhaust nozzle for a gas turbine engine, and more particularly, to a thrust vectoring exhaust nozzle.

Background

The use of thrust vectoring exhaust nozzles in high performance gas turbine engine powered aircraft is well known. Such nozzles are provided with means to selectably divert at least a portion of the engine exhaust gas and/or bypass fan air in order to achieve a varible direction collective nozzle thrust vector. Such thrust vector means can include movable surfaces defining the nozzle gas flow path, alternate nozzle exhaust gas flow passages, etc..

For certain high speed, high performance aircraft it is necessary to provide an exhaust gas flow passage which converges to a variable area nozzle throat, and diverges downstream thereof in order to efficiently expand the discharged gas over a variety of engine operating conditions and thrust levels. Another desirable feature for such engine-nozzle systems is the ability to achieve a reverse thrust configuration wherein at least the majority of the exhaust gas is directed forwardly to retard thrust during maneuvering or landing of the aircraft.

As may be expected, each of the above described functions adds both weight and complexity to the associated nozzle structure, attributes which are particularly undesirable given the typical location of the exhaust nozzle at the extreme aftward end of the aircraft and the associated environment of use, i.e. high performance, highly maneuverable aircraft.

Prior art nozzle designs have achieved at least partial thrust vectoring without complex mechanical components by limiting nozzle thrust vectoring to a single plane. Such nozzles typically provide only the ability to pitch the aircraft in the vertical plane by means of one or more nozzle flap surfaces for diverting the exhaust gas. Prior art nozzles able to achieve multi-plane thrust vectoring, i.e. yaw and pitch, have typically been far more complex in terms of individual mechanical component design and operation. What is needed is a yaw and pitch thrust vectoring exhaust nozzle which is both simple and lightweight.

SUMMARY OF THE INVENTION

According to the present invention, an exhaust nozzle for a gas turbine engine is provided for means for selectably directing the discharged exhaust gases to achieve yaw and pitch thrust vectoring as well as reversing. The directing means includes a fixed collar having a semispherical exterior surface and two gimballed clamshells which are positioned for directing the engine exhaust gas passing through the fixed collar. The clamshells fit closely about the spherical collar surface and each include sealing means for preventing leaking of the exhaust gas between the collar and clamshell.

The clamshells each move independently about a common axis oriented transverse to the discharged gas stream for controlling both the nozzle throat area as well as the pitch angle of the exhausted gas. The clamshells move jointly about the gimbal axis which is perpendicular to the common axis, thereby directing the discharged gas at a selected yaw angle.

According to a further embodiment of the present invention, a divergent flap is each hinged to each of the two clamshells at the corresponding adjacent edge for jointly defining a convergent-divergent gas flow path as may be required for supersonic nozzle operation. The divergent flaps pivot with the clamshells about the common and gimballed axes, thereby achieving pitch vectoring and highly efficient exhaust gas expansion.

The present invention also includes a thrust reversing configuration wherein the clamshells are positioned to substantially block the aftward flow of exhaust gas, forcing the gas to discharge generally forwardly through at least one reverse flow gas passage. In still another embodiment of the nozzle according to the present invention, the passages are disposed in the pivotable nozzle structure for achieving vectorable reverse thrust.

The present invention achieves the desired thrust vectoring operation while minimizing the weight of the individual components by using semispherical members in the pressure containing portions of the nozzle, i.e. the collar and clamshells. The close fitting, spherical members not only provide the smallest and most efficient geometric shape for enclosing the high pressure exhaust gas, but by providing pivot and gimbal axes for the clamshells which intersect at the center point of the spherical collar surface, the present invention achieves a uniform seal gap over the complete range of nozzle yaw and pitch movement. Further, the reversing and convergent-divergent nozzle embodiments achieve the desired additional functions by the movement of the gimballed clamshells and with a minimum of additional weight or structure.

Both these and other objects and advantages of the present invention will be apparent to those skilled in the art upon review of the following specification and the appended claims and drawing figures.

DETAILED DESCRIPTION OF THE INVENTION

Figure 1:
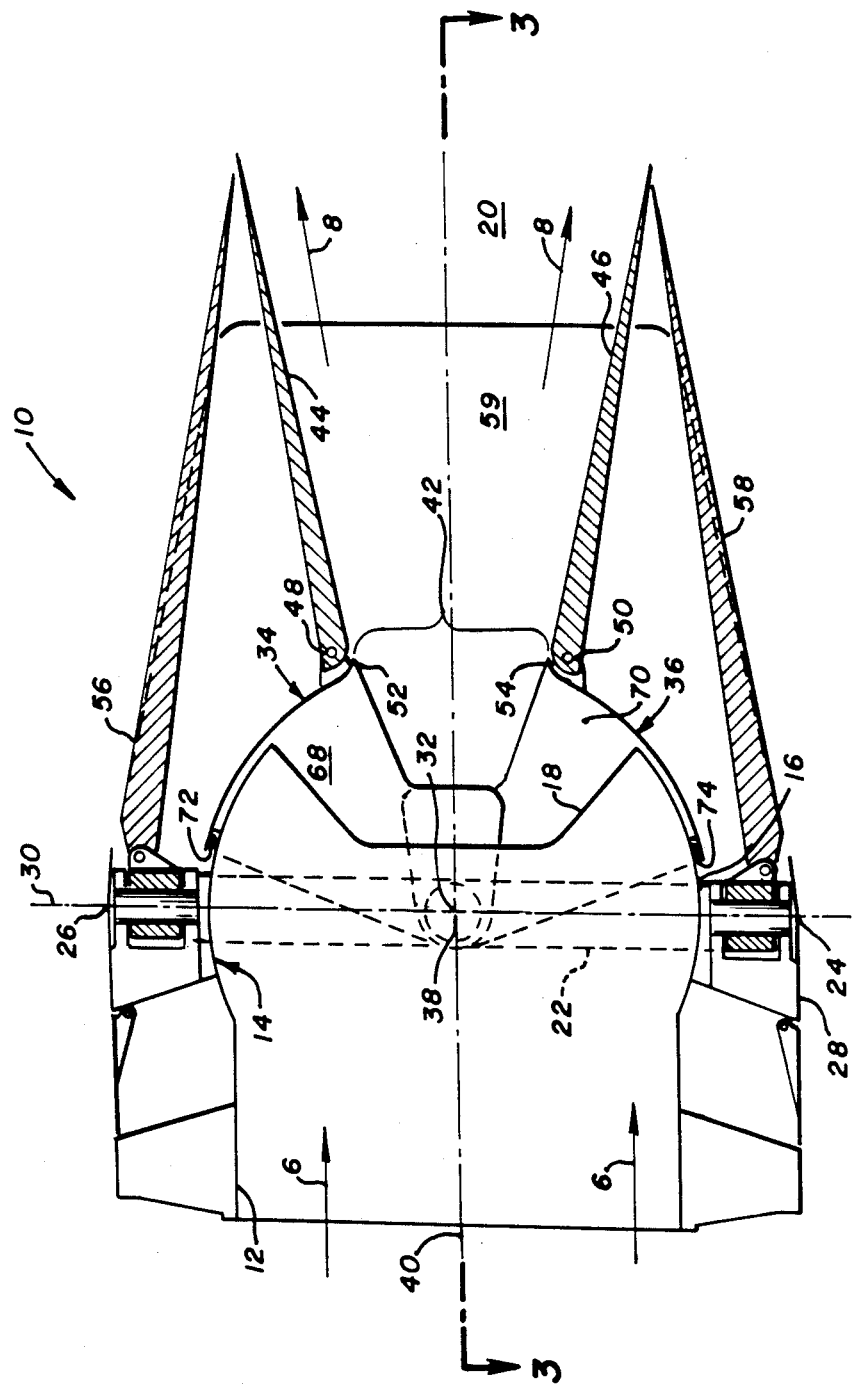
FIG. 1 shows a cross section of a nozzle according to the present invention taken in the vertical plane.

FIG. 1 shows a schematic cross section taken in the vertical plane of a nozzle 10 according to the present invention. The nozzle receives pressurized exhaust gas 6 from a gas turbine engine (not shown) through a conduit 12. The conduit 12 terminates in a collar portion 14 having a generally spherical external surface 16. The collar 14 includes a rearwardly facing opening 18 for discharging the exhaust gas into the nozzle outlet 20. The nozzle 10 further includes a gimbal ring 22 disposed about the collar 14 and including two opposed gimbal pivots 24, 26 for supporting the gimbal ring 22 relative to the nozzle static structure 28.

The gimbal pivots 24, 26 lie along a gimbal axis 30 shown in the vertical plane of FIG. 1 and which passes through a center point 32 defined by the collar spherical source 16. The gimbal ring 22 supports upper and lower clamshells 34, 36 which are independently pivotable about a common axis 38 oriented both perpendicular to the gimbal axis 30 and transverse to the nozzle center line 40. The common axis 38 passes through the collar spherical surface center point 32 and is shown coincident therewith in the vertical cross section of the FIG. 1.

Clamshells 34, 36 are independently pivotable to achieve a varying nozzle throat dimension 42 in order to provide the optimum nozzle outlet area for efficient thrust production. Thrust vectoring in the vertical plane may be achieved by orienting the clamshells 34, 36 asymmetrically with respect to the nozzle center line 40 so as to bias the flow of discharged gas 8 relative thereto.

The embodiment of FIG. 1 also includes upper and lower divergent flaps 44, 46 for providing a properly divergent gas flow path downstream of the nozzle throat 42. The divergent flaps 44, 46 are pivotably secured by linear hinges 48, 50, respectively formed at the throat lips 52, 54 of the respective upper and lower clamshells 34, 36. The divergent flaps 44, 46 in cooperation with spaced apart fixed side walls 61 (not shown), 59 define a divergent gas flow path aftward of the nozzle throat 42 for ensuring efficient expansion of the exhaust gas 8, especially for supersonic flow nozzles 10.

The divergent flaps 44, 46 are independently movable relative to the associated clamshell components 34, 36 and may thus be positioned to vary the divergent angle as well as the pitch thrust angle of the discharged gases 8. Outer fairing flaps 56, 58 provide a smooth exterior surface for airflow about the aircraft, and are hinged adjacent the upper and lower gimbal pivots 26, 24 as shown.

Figure 2:
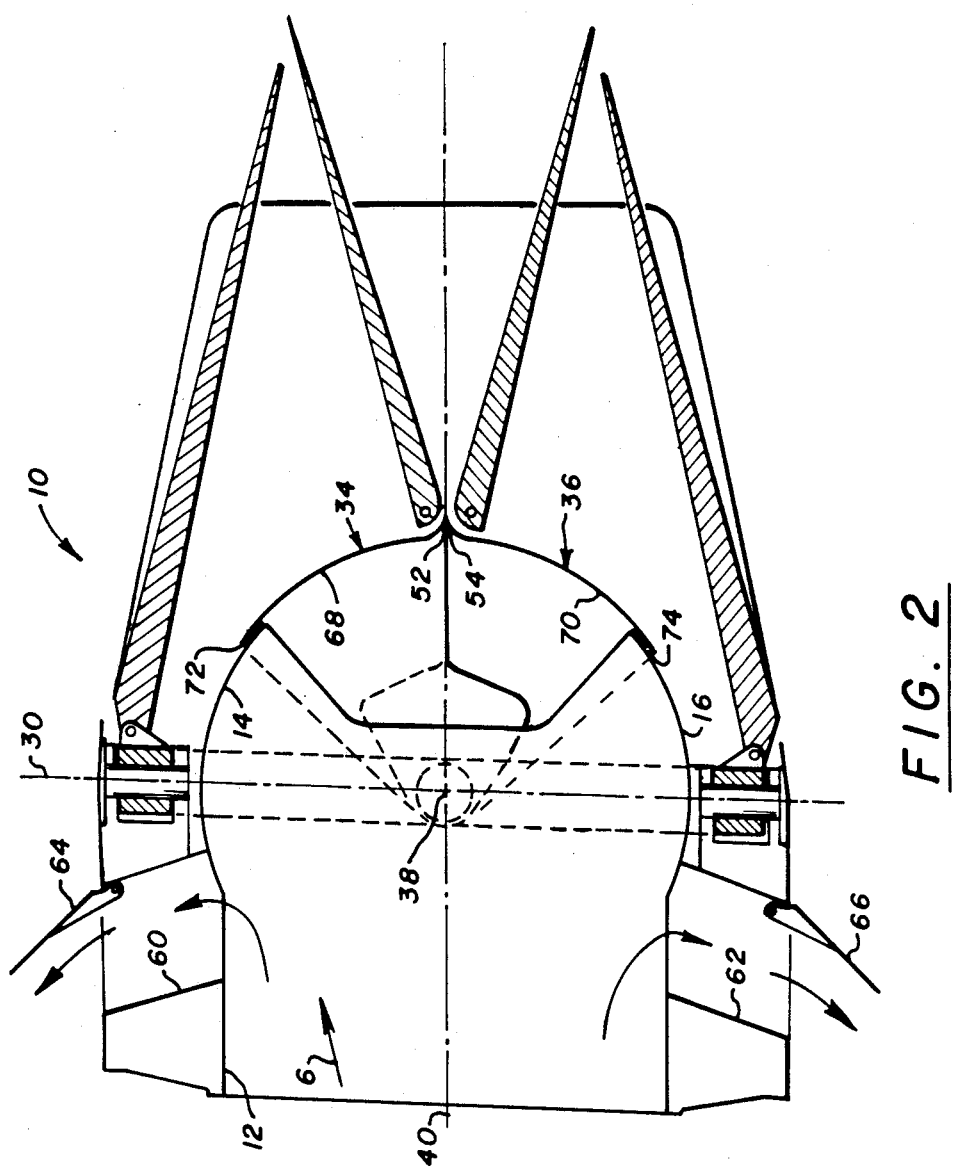
FIG. 2 shows the nozzle of FIG. 1 in a reverse thrust configuration.

FIG. 2 shows the nozzle 10 of Figure A configured so as to provide reverse thrust such as during descent of the aircraft or upon landing wherein it is desired to reduce forward speed. In the configuration of FIG. 2, the clamshells 34, 36 are moved to substantially close the throat 42 by contacting the clamshell throat lips 52, 54. The collar 14 and clamshells 34, 36 thus establish a closed end to the exhaust gas duct 12. Exhaust gases 6 flowing in the duct 12 turn laterally, exiting the nozzle 10 via reverser passages 60, 62. Reverser flaps 64, 66 are shown in the open position so as to exhaust the gases in a generally forward direction, thereby producing the desired reverse thrust.

As will be appreciated by reviewing FIGS. 1 and 2, the upper and lower clamshells 34, 36 having generally spherical interior surfaces 68, 70 maintain a uniform spacing with regard to the spherical surface 16 of the collar 14. The nozzle 10 according to the present invention provides arcuate seals 72, 74 disposed between the clamshell spherical surfaces 68, 70 and the collar spherical surface 16 for preventing the flow of exhaust gas 6 therebetween. As the clamshells 34, 36 maintain this uniform spacing over the entire range of motion about the common axis 38, seals 72, 74 may therefore be relatively simple in design, such as piston rings or spring seals.

Figure 3:
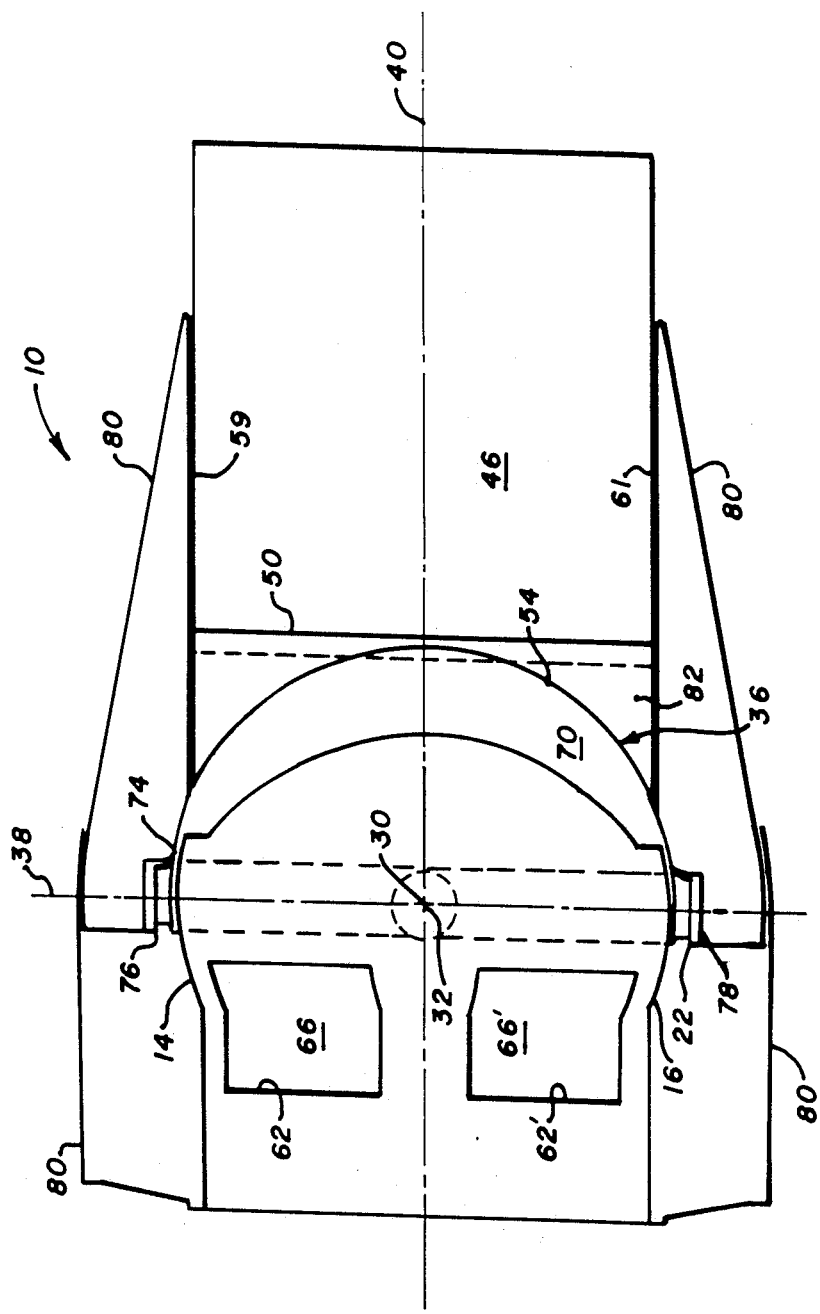
FIG. 3 shows a sectional view of the nozzle of FIG. 1, but in the horizontal plane.

The advantage of the gimballed double clamshell arrangement according to the present invention is further appreciated by referring now to FIG. 3 which shows a horizontal cross section of the nozzle 10 according to the first embodiment of the present invention. Lower clamshell 36 is shown supported between opposing pivot joints 76, 78 which are supported by the gimbal ring 22. Common axis 38 now lies in the plane of the cross section while the gimbal axis 30 is coincident with the center point 38 of the fixed collar spherical surface 16. The lower clamshell seal 74 is shown disposed between the clamshell inner surface 70 and the collar spherical surface 16, thereby providing sealing between these two members as the clamshell 36, lower divergent flap 46, and the spaced apart side walls 59, 61 are rotated about the gimbal axis 30.

Such rotation provides yaw thrust vectoring to the nozzle 10 according to the present invention, thus achieving a fully vectorable arrangement for highly maneuverable aircraft applications. The side walls 59, 61 are supported from the gimbal ring 22 and rotate therewith. External sidewall fairing members, generally denoted by numeral 80, provide a smooth aerodynamic exterior surface of the nozzle 10. Lower reverser flow passages 62, 62' are also visible in FIG. 3.

FIG. 3 more clearly shows the interface between the lower clamshell 36 and the lower divergent flap 46 at the linear hinge joint 50. Lower clamshell 36 includes a planer stub flap 82 extending generally radially with respect to the spherical center point 38 and secured to the nozzle lip 54 of the lower clamshell 36. Engine exhaust 6 entering the nozzle via exhaust duct 12 thus transitions from an axisymmetric flow stream with respect to the nozzle center line 40 to a rectangular flow path defined between planer upper and lower divergent flaps 44, 46 and opposing side walls 59, 61 downstream of the nozzle throat 42. The simplicity of the actuator structures for positioning the divergent flaps 44, 46 is significant as compared to prior art axisymmetric divergent nozzles wherein a plurality of individual sliding flaps define an axisymmetric, divergent flow path for the exhausted gases.

It is further a feature of the gimballed clamshell and spherical collar nozzle arrangement according to the present invention that the nozzle interior region containing the highest gas static pressure is disposed within the spherical shaped clamshells 34, 36 and collar 14. The spherical members are thus located substantially in tension, reducing the size and weight of such pressure containing members. The evenly distributed tensile force avoids local component deformation which may cause binding, leaking, or other mismatch between the sliding members thereby allowing the use of much lighter weight materials and structures to achieve the desired high pressure containment.

The overall result is a nozzle 10 wherein convergent, thrust vectoring, and thrust reversing, functions are achieved with a minimum number of moving parts and complexity. The double spherical clamshell and collar design provides a lightweight, pressure resistant structure which is resistant to warpage due to pressure or thermal effects.

Figure 4:
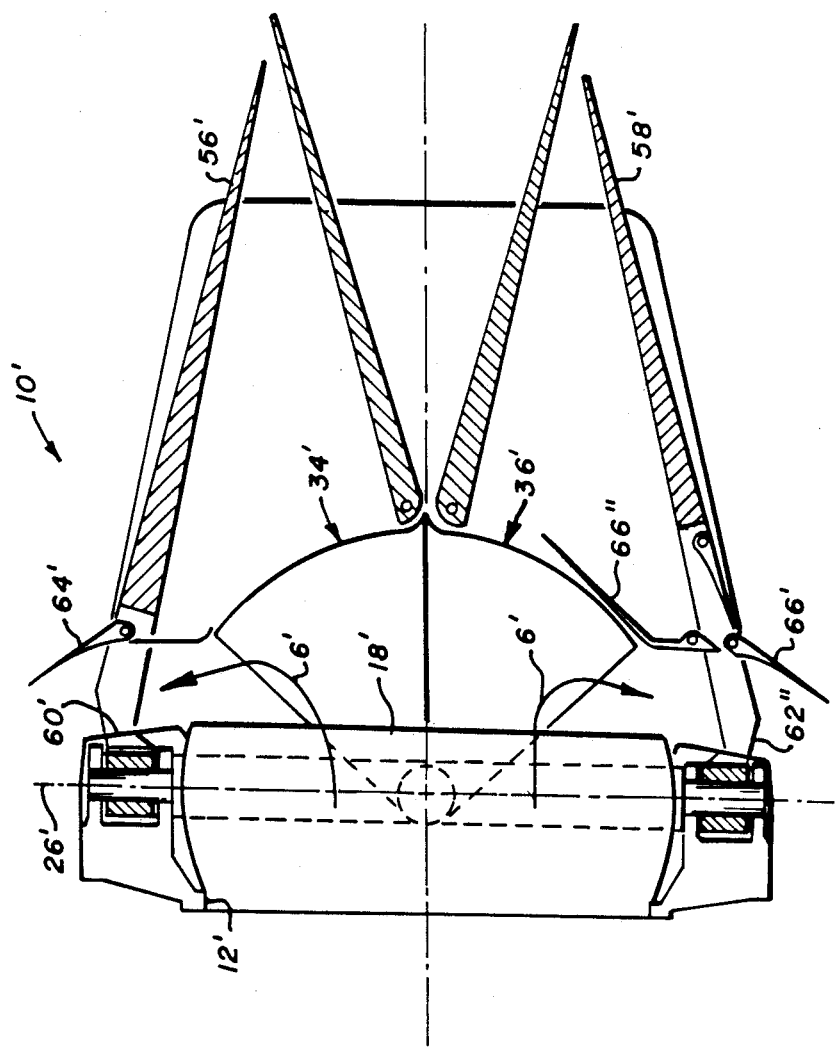
FIG. 4 shows a vertical plane section of a second embodiment according to the present invention in a reverse thrust configuration.
Figure 5:
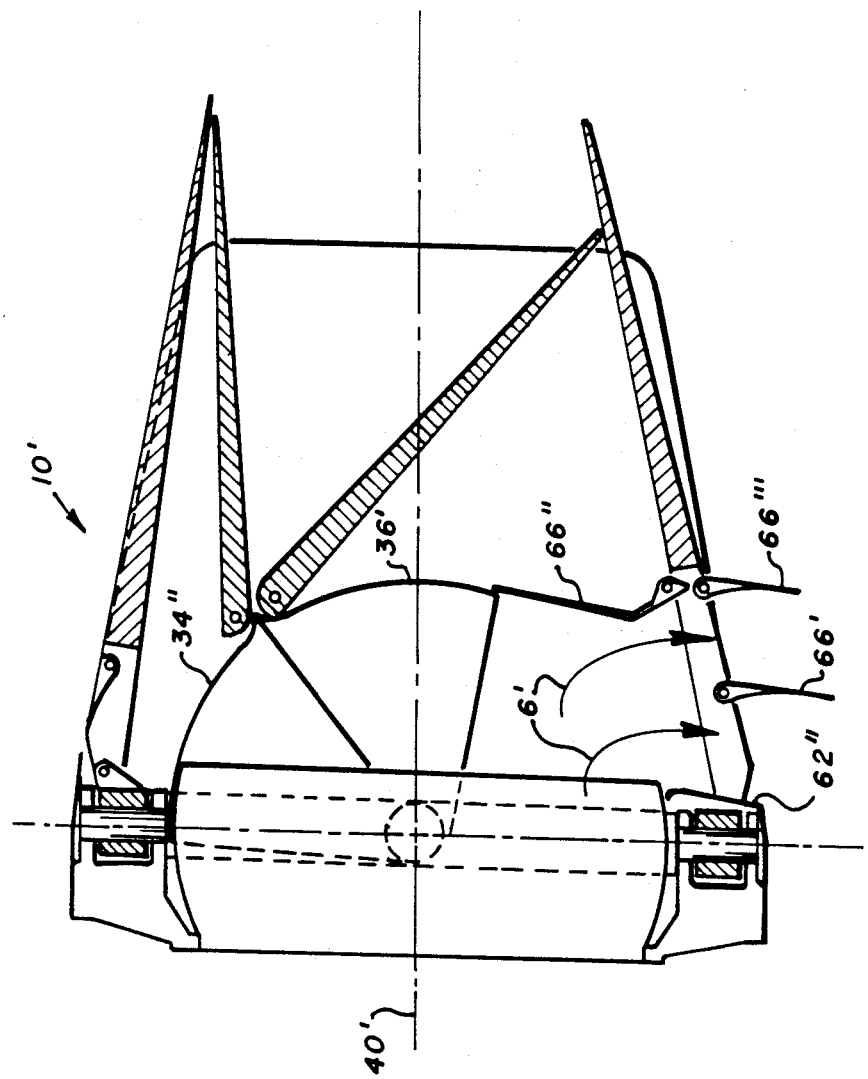
FIG. 5 shows the nozzle of FIG. 4 configured to direct substantially all of the exhaust gases vertically with respect to the nozzle centerline, such as in a vertical or short takeoff or landing aircraft application.

FIGS. 4 and 5 shows an alternative embodiment 10' of the nozzle according to the present invention wherein like numbered components are substantially identical to those shown and described in the preceding figures and text. The alternate configuration, however, does not provide a completely closed end to the exhaust duct 12 when the upper and lower clamshells 34, 36 are moved so as to close off the nozzle throat 42. The clamshells 34, 36 in the arrangement as shown in FIG. 4 block the flow of gas rearwardly from the nozzle 10, diverting it laterally into reverse thrust flow passages 60', 62" defined between the respective clamshells 34, 36 and the downstream facing opening 18' of the collar 12'.

Exterior reverser doors 64', 66' shown disposed in the outer divergent fairing flaps 56', 58' exhaust the diverted gases 6' generally forwardly for achieving the desired reverse thrust. As will be apparent by inspection of FIG. 4, the reverse flow passages 60', 62" of the second embodiment of the nozzle 10' according to the present invention move with the clamshells 34, 36 and divergent fairing flaps 56', 58' about the gimbal axis 26'. Thus, the alternate embodiment as shown in FIG. 4 is able to selectably provide yaw thrust vectoring during reverse thrust operation.

Pitch thrust vectoring during thrust reversal may be achieved in the second embodiment by orienting the closed clamshells 34', 36' asymmetrically with respect to the nozzle axis 40' as shown in FIG. 5. FIG. 5 shows the joined clamshells 34', 36' biased upwardly so as to close of all gas flow through the upper reverss thrust flow passage 60' and to direct all the engine exhaust gases 6' downwardly via the lower reverse thrust passage 62". Internal and external flow directing flaps 66', 66" and 66''' provide the flow directing stuctures necessary to accommodate the additional gas flow. The arrangement of FIG. 5 may be especially useful for a short takeoff or landing aircraft wherein it is desired to achieve significant downward thrust during at least a portion of the flight envelope. Similar flow directing structures may be provided to the upper reverse thrust flow path 60' if required to achieve a similar vertical thrust in the opposite upward direction.

The nozzle embodiments 10, 10' according to the present invention thus provide relatively simple, omnidirectional thrust vectoring structures which can achieve yaw and pitch thrust vectoring, thrust reversing, variable nozzle throat area, and convergent-divergent exhaust gas flow path without a significant increase in mechanical complexity or weight over comparable exhaust nozzles operable to achieve thrust vectoring in only a single plane. It should further be appreciated that the embodiments shown in FIGS. 1-5 and discussed hereinabove are only two of a wide variety of essentially equivalent nozzle arrangements within the scope of the present invention, and should therefore be viewed as merely illustrative of the invention and not in a limiting sense.

We claim:

1. A thrust vectoring exhaust nozzle for directing a gas stream, comprising:
   a fixed exhaust collar having a semispherical external surface, an internal passage for conducting the gas stream therethrough, and an aftward facing discharge opening;
   a gimbal assembly including first and second pivots secured adjacent the spherical collar surface and defining therebetween a first gimbal axis passing through a center point defined by the collar spherical surface, and a gimbal ring, surrounding the collar and pivotally supported by the first and second gimbal pivots;
   third and fourth pivots defining therebetween a second common axis perpendicular to the first gimbal axis;
   a first clamshell having a spherical interior surface corresponding to the collar spherical exterior surface, the first clamshell secured between the third and fourth pivots and selectably pivotable about the second common axis;
   a second clamshell having a spherical surface corresponding to the spherical exterior surface of the fixed collar, the second clamshell also secured between the third and fourth pivot points and selectably pivotable about the second common axis;
   first slidable means for sealing the first clamshell to the exterior of the fixed collar;
   second slidable means for sealing the second clamshell to the exterior of the fixed collar; and
   means for selectably rotating the gimbal ring about the first gimbal axis.

2. The nozzle as recited in claim 1, wherein the first and second clamshells each include
   a facing lip edge for defining an exhaust nozzle throat therebetween, and wherein the first and second clamshells each further include
   a planer stub flap secured to the respective nozzle lip of the first and second clamshells, each stub flap extending generally radially outward therefrom with respect to the spherical center point and each flap terminating in a first linear hinge oriented perpendicular to the first gimbal axis and parallel with the second common axis,
   a first upper divergent flap having a leading edge secured to the linear hinge of the stub flap of the first clamshell;
   a second lower divergent flap having a leading edge secured to the linear hinge of the stub flap of the second clamshell, and
   means for selectably pivoting the first and second divergent flaps about the corresponding linear hinges of the respective first and second clamshells.

3. The nozzle as recited in claim 1, further including:
   at least one reverse gas flow passage having means for regulating the flow of gas therethrough, said gas flow passage disposed between the collar internal flow passage and the exterior of the nozzle for discharging the gas stream during selected periods of desired reverse thrust.

4. A thrust vectoring exhaust nozzle comprising:
   a fixed outlet collar having a generally rearward facing exhaust opening and a semispherical external surface defined about a center point;
   a gimbal ring, pivotably secured about the fixed collar and rotatable about a gimbal axis passing through the center point, the gimbal axis being oriented transversely with respect to a gas stream flowing through the outlet collar;
   a first clamshell having a surface corresponding to the exterior collar spherical surface;
   a second clamshell having a surface corresponding to the exterior collar spherical surface;
   the first and second clamshells being pivotably secured to the gimbal ring at second and third pivot points and independently pivotable about a common axis defined between the third and fourth pivot points, said common axis passing through the center point and oriented perpendicularly with respect to the gimbal axis and the flowing gas stream.

5. The nozzle as recited in claim 4, wherein:
   the clamshells each include a nozzle lip defining a nozzle throat thereby, and wherein the clamshells are pivotable into contact at said nozzle lips, the contacted clamshells defining a semispherical blocking structure disposed in the gas stream for substantially closing the flow of exhaust gas aftward from the nozzle, and wherein the nozzle further comprises:

at least one reverse flow passage defining an alternate exhaust gas discharge path when the first and second clamshells define said blocking structure.

6. The nozzle as recited in claim 5, wherein:

the contacted clamshells define a flow blocking structure smaller than the fixed collar opening, and wherein the exhaust gas flow passes out of the nozzle via upper and lower lateral openings defined between the fixed collar and the corresponding contacted upper and lower clamshells.

7. The nozzle as recited in claim 4, wherein the upper and lower clamshells each further include:

a radially extending, planer stub flap secured to the nozzle lip of each clamshell, each stub flap including a linear hinge joint at the radially outward flap edge, and wherein the nozzle further comprises upper and lower divergent flaps, each flap having a leading edge secured to the linear hinge joint of the corresponding first and second clamshell stub flap, and a pair of spaced apart side walls, secured to the gimbal ring and extending aftward adjacent the stub flaps and divergent flaps and oriented generally perpendicular thereto, the stub flaps, divergent flaps, and side walls together defining a variable geometry nozzle outlet passage.

* * * * *